(12) United States Patent
Krausz

(10) Patent No.: US 6,293,556 B1
(45) Date of Patent: Sep. 25, 2001

(54) SEAL FOR COUPLING AND CONNECTING MEANS

(75) Inventor: Eliezer Krausz, Tel Aviv (IL)

(73) Assignee: Krausz Metal Industries, Ltd., Tel Aviv (IL)

( * ) Notice: Subject to any disclaimer, the term of this patent is extended or adjusted under 35 U.S.C. 154(b) by 0 days.

(21) Appl. No.: 09/156,288

(22) Filed: Sep. 17, 1998

(30) Foreign Application Priority Data

Sep. 18, 1997 (IL) ........................................ 121796

(51) Int. Cl.$^7$ ...................................... F16L 17/00
(52) U.S. Cl. .................. 277/549; 285/110; 285/369; 277/551
(58) Field of Search ..................... 277/549, 551, 277/565, 592, 573, 3, 4; 285/110, 369, 231

(56) References Cited

U.S. PATENT DOCUMENTS

| | | |
|---|---|---|
| 293,734 | 2/1884 | Harrison . |
| 3,315,970 | 4/1967 | Holloway . |
| 3,432,189 | 3/1969 | Buller . |
| 3,486,772 | 12/1969 | Elsner . |
| 4,480,860 | * 11/1984 | Foresta et al. ................. 285/177 |
| 4,824,148 | 4/1989 | Grabowski . |
| 5,203,594 | * 4/1993 | Straub ........................... 285/110 |
| 5,257,834 | 11/1993 | Zeidler et al. . |
| 5,314,213 | * 5/1994 | Heister et al. ................. 285/369 |
| 5,476,292 | * 12/1995 | Harper .......................... 285/369 |
| 5,941,576 | * 8/1999 | Krausz .......................... 285/110 |

FOREIGN PATENT DOCUMENTS

| | | |
|---|---|---|
| 2098297 | 5/1982 | (GB) . |
| 114078 | 11/1997 | (IL) . |

* cited by examiner

Primary Examiner—Anthony Knight
Assistant Examiner—Enoch E. Peavey
(74) Attorney, Agent, or Firm—Kilpatrick Stockton LLP

(57) ABSTRACT

Coupling and Connecting Means for pipes of the same or different diameters and a seal to be used with such connecting means. The seal being a ring shaped seal made of rubber or other resilient material is composed of two ring parts the first one seated over the second one and connected thereto in a manner which will allow easy disconnecting the second ring from the first ring.

3 Claims, 3 Drawing Sheets

SEAL FOR COUPLING AND CONNECTING MEANS

FIELD OF INVENTION

The present invention relates to coupling and connecting means to be used with pipes of same or different diameters made of all kinds of material and more particularly to the sealing means for such connecting means.

There are known a very large variety of means for connecting two abutting pipes whether of the same or different material. The sealing means of such connectors in most cases is a rubber ring or other resilient material.

In Israeli Patent Application No. 114078 there is described and claimed a connector similar to the connector subject matter of the present application.

Experience has shown that in order to be able to connect two pipes of different diameters when the difference between the diameter of the pipe s is more substantial it is necessary to use a special connector both ends of which being of different diameter.

OBJECTS OF INVENTION

It is thus the object of the present invention to provide a novel seal for coupling and connecting means, to be used when the diameter of two abutting pipes is the same or differ.

It is a further object of the present invention to provide a seal of novel cross section.

It is a further object of the present invention to provide a seal made of two parts which could be used as a whole or one part thereof.

By using two sizes of such seal a connector of a given diameter could be used for connecting two pipes of different diameter, the difference of which could be quite substantial.

ABSTRACT OF DISCLOSURE

The seal according to the invention is placed within a U-shaped ring which is placed over an outwardly flaring circumferential flange of a connector's barrel shaped body.

According to the invention there is provided a sealing ring made of resilient material comprising a first sleeve-like ring, the cross section of which defines a space therein, and a second ring overriding the first sleeve-like ring and being loosely connected to said first ring which enables the tearing off of said second ring.

SHORT DESCRIPTION OF DRAWINGS

The invention will now be described with reference to the annexed drawings in which.

Figure 3:
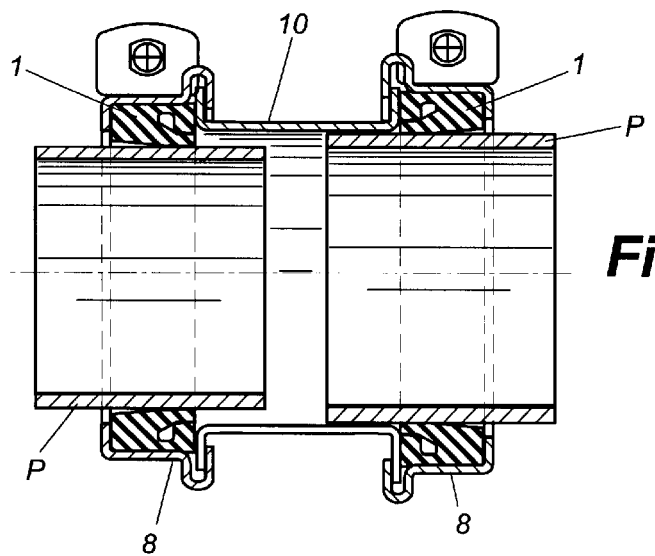
Figure 4:
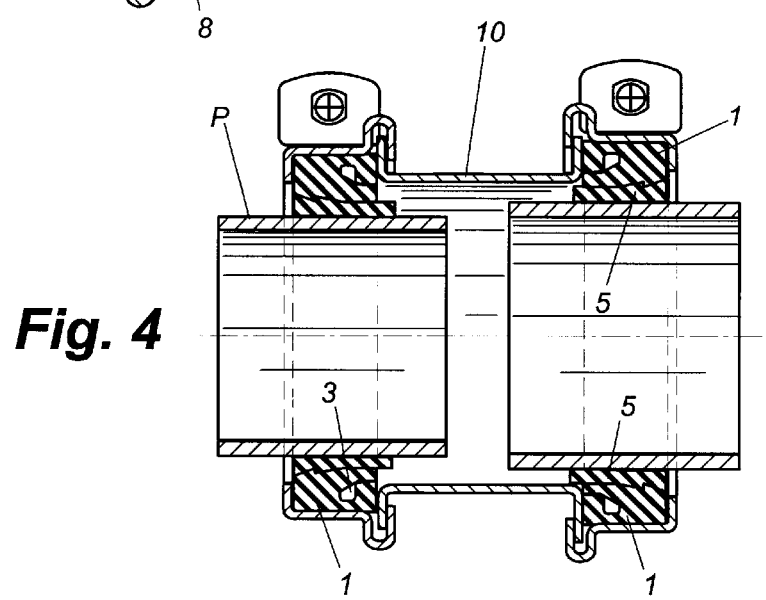
Figure 5:
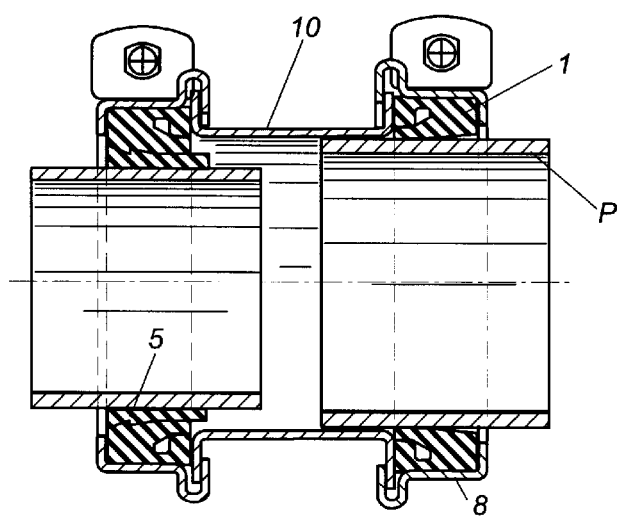
Figure 6:
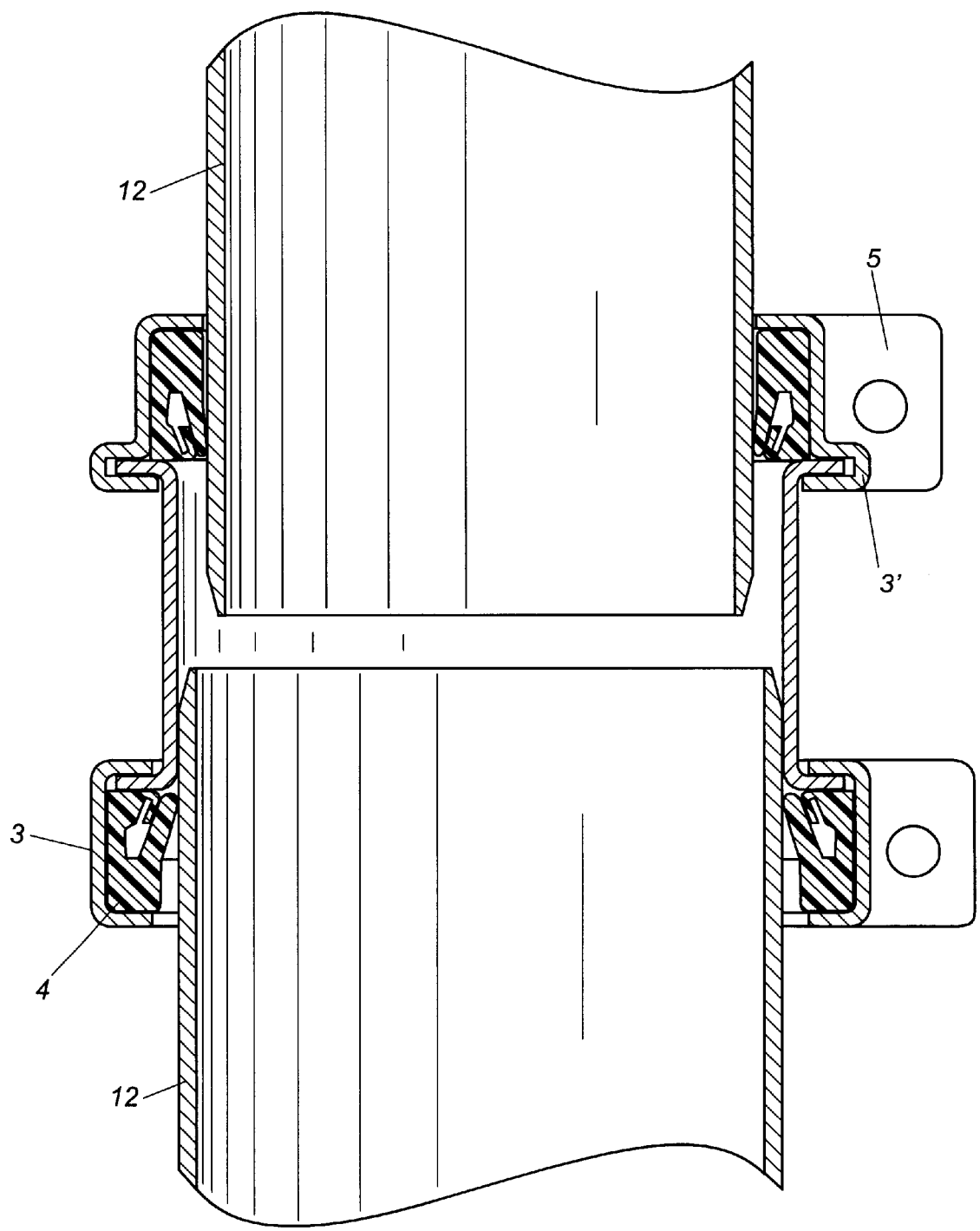

FIGS. 3, 4, and 5 demonstrate three ways of the use of the seal with respective connecting means, and FIG. 6 illustrates an embodiment of a seal according to the invention.

DESCRIPTION OF PREFERRED EMBODIMENT

Figure 1:
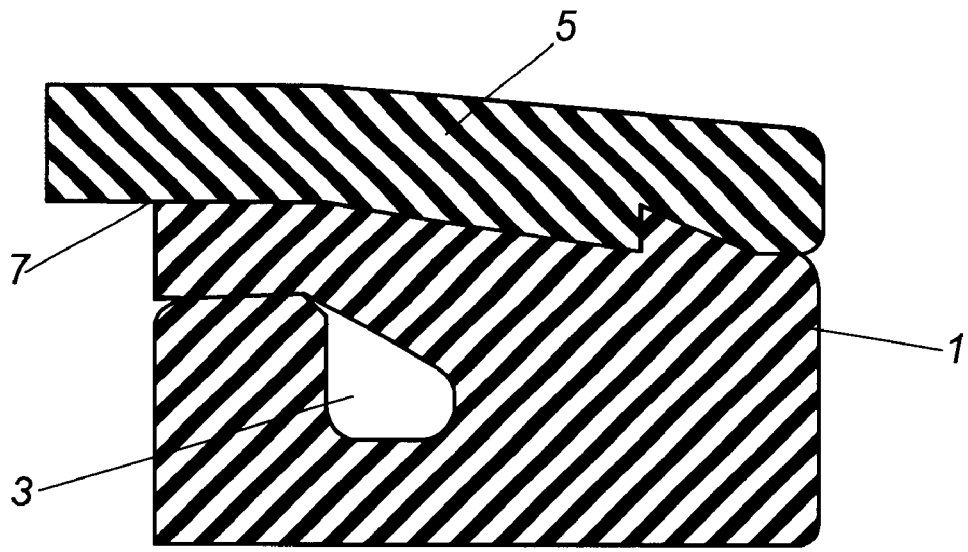
FIG. 1 is a cross section of a seal profile.
Figure 2:
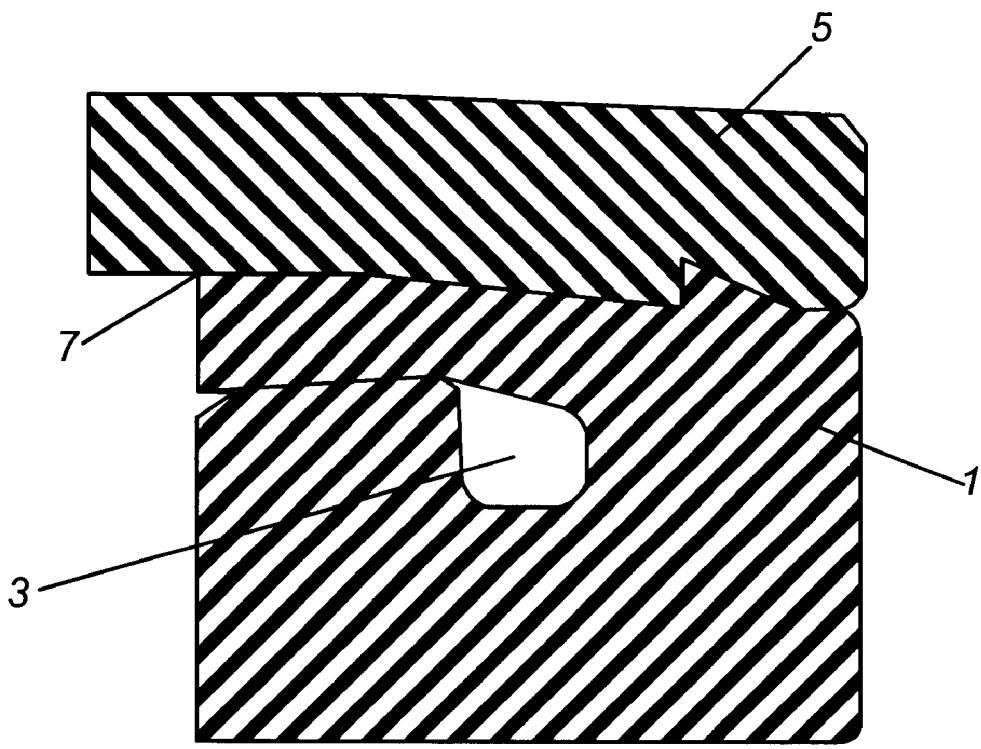
FIG. 2 is a cross section of a seal profile embodiment.

Turning first to FIG. 1 the seal which is made of resilient material such as rubber or the like. The seal is divided into two main parts, the first part 1 being a sleeve-like ring which is preferably provided with inner space 3 to which reference will be made, and the second ring part 5 which is connected to said first sleeve part at 7.

Said second ring part 5 rides over said first sleeve 1 and could be removed by tearing and separating between the two parts. The tearing off is made along a thin connection line 7.

Said second ring part 5, as can be seen, provides said first sleeve part with additional thickness thus enabling to connect tight seal smaller diameters pipe.

FIGS. 3, 4, and 5 demonstrate a few possibilities of using the seal with different size pipes.

In FIG. 3 only the first part 1 is being used even though the pipes P are of different diameter, however the difference is not substantial. As can be seen the seal is placed within a circumferential ring 8 being part of connector body 10.

FIG. 4 demonstrates the use of the combined version of the seal while FIG. 5 illustrates the use of a seal when one side is used only with the inner part 1 of the seal while the other side is with the seal and second ring 5.

The inner space 3 is in communication with the liquid within the pipes thus when pressured fluid is delivered through the pipes said fluid enters space 3 and applies pressure therein which inevitably adds to the tightening of seal.

It is quite apparent that by using the seal according to the invention as a whole of just the first part the same connector 10 could be used with different sizes of pipes.

FIG. 6 illustrates a "double" seal namely the same seal having two sides to be used with a two sided connector.

What is claimed is:

1. A sealing ring for pipe connector means made of resilient material, the sealing ring comprising a first sleeve-like ring the cross section of which defines a inner space therein, and a second ring overriding said first sleeve-like ring and being loosely connected to said first ring, said second ring being adapted to be torn off said first ring at a predetermined location so as to adapt the sealing ring to interconnect pipes of substantially different diameters.

2. A sealing ring as claimed in claim 1 where said second ring is integral with said first ring.

3. A sealing ring as claimed in claim 1 where said seal is incorporated with connecting means provided with a U shape ring and placed within said U shaped ring.

* * * * *

UNITED STATES PATENT AND TRADEMARK OFFICE
Certificate

Patent No. 6,293,556 B1                                                                Patented: September 25, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Eliezer Krausz, Tel Aviv (IL); and Avraham Chiproot, Kfar Saba (IL).

Signed and Sealed this Thirteenth Day of November 2012.

<div style="text-align:right">

THOMAS BEACH
*Supervisory Patent Examiner*
Art Unit 3674
Technology Center 3600

</div>

UNITED STATES PATENT AND TRADEMARK OFFICE
CERTIFICATE OF CORRECTION

PATENT NO. : 6,293,556 C1  Page 1 of 1
APPLICATION NO. : 90/011858
DATED : July 10, 2012
INVENTOR(S) : Krausz et al.

It is certified that error appears in the above-identified patent and that said Letters Patent is hereby corrected as shown below:

On the front page, field (75), Inventor:, add --Avraham Chiproot, Kfar Saba (IL)--.

Signed and Sealed this
Twenty-second Day of January, 2013

David J. Kappos
*Director of the United States Patent and Trademark Office*

(12) EX PARTE REEXAMINATION CERTIFICATE (9125th)
United States Patent
Krausz

(10) Number: US 6,293,556 C1
(45) Certificate Issued: Jul. 10, 2012

(54) SEAL FOR COUPLING AND CONNECTING MEANS

(75) Inventor: Eliezer Krausz, Tel Aviv (IL)

(73) Assignee: Krausz Industries Development Ltd., Tel Aviv (IL)

Reexamination Request:
No. 90/011,858, Aug. 12, 2011

Reexamination Certificate for:
Patent No.: 6,293,556
Issued: Sep. 25, 2001
Appl. No.: 09/156,288
Filed: Sep. 17, 1998

(51) Int. Cl.
*F16J 15/32* (2006.01)
*F16L 17/00* (2006.01)

(52) U.S. Cl. .................. 277/549; 285/110; 285/369; 277/551

(58) Field of Classification Search .................. None
See application file for complete search history.

(56) References Cited

To view the complete listing of prior art documents cited during the proceeding for Reexamination Control Number 90/011,858, please refer to the USPTO's public Patent Application Information Retrieval (PAIR) system under the Display References tab.

*Primary Examiner* — Beverly M. Flanagan

(57) ABSTRACT

Coupling and Connecting Means for pipes of the same or different diameters and a seal to be used with such connecting means. The seal being a ring shaped seal made of rubber or other resilient material is composed of two ring parts the first one seated over the second one and connected thereto in a manner which will allow easy disconnecting the second ring from the first ring.

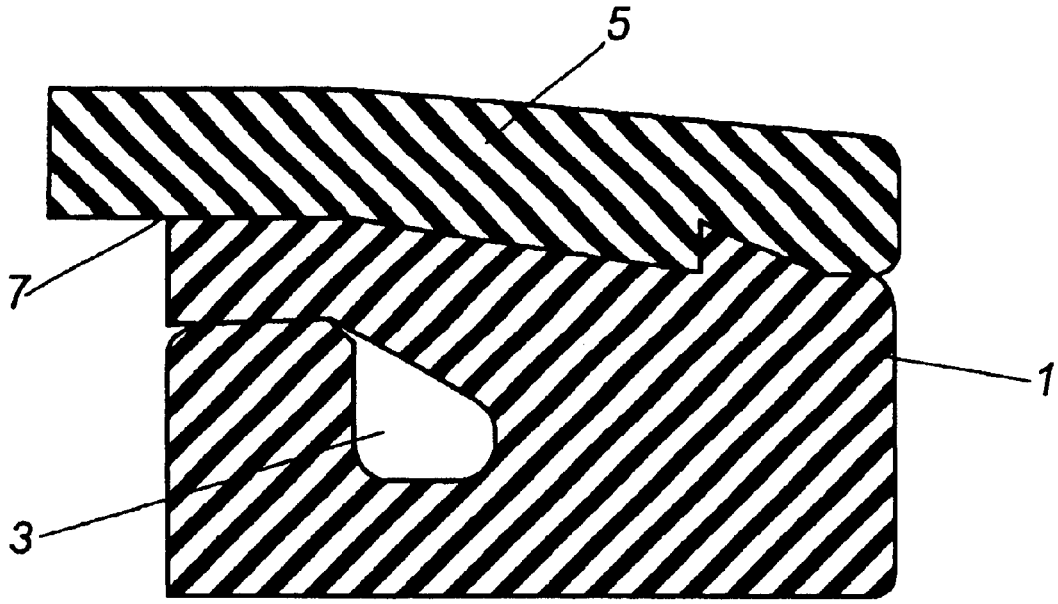

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-3 is confirmed.

* * * * *